(12) United States Patent
Edara et al.

(10) Patent No.: US 11,449,080 B2
(45) Date of Patent: Sep. 20, 2022

(54) UAV FLIGHT MANAGEMENT PLANNER

(71) Applicant: Honeywell International Inc., Morris Plains, NJ (US)

(72) Inventors: Thandava Krishna Edara, Plymouth, MN (US); Arjun Bindu Jyothikumar, Minneapolis, MN (US); Richard S. Russell, Roseville, MN (US); Moses Bangura, Golden Valley, MN (US); Saul Cooper, Fridley, MN (US)

(73) Assignee: Honeywell International Inc., Charlotte, NC (US)

( * ) Notice: Subject to any disclaimer, the term of this patent is extended or adjusted under 35 U.S.C. 154(b) by 303 days.

(21) Appl. No.: 16/667,812

(22) Filed: Oct. 29, 2019

(65) Prior Publication Data

US 2021/0124376 A1 Apr. 29, 2021

(51) Int. Cl.
| | |
|---|---|
| *G05D 1/12* | (2006.01) |
| *B64F 5/60* | (2017.01) |
| *B64C 39/02* | (2006.01) |
| *G06Q 30/00* | (2012.01) |

(52) U.S. Cl.
CPC ............ *G05D 1/12* (2013.01); *B64C 39/024* (2013.01); *B64F 5/60* (2017.01); *G06Q 30/018* (2013.01); *B64C 2201/12* (2013.01)

(58) Field of Classification Search
CPC .... G05D 1/12; B64C 39/024; B64C 2201/12; B64F 5/60; G06Q 30/018; G06Q 10/063; G06Q 10/20; G06Q 50/06; G06Q 10/047; G06Q 10/0613; G01C 23/00; G06F 30/15
See application file for complete search history.

(56) References Cited

U.S. PATENT DOCUMENTS

| | | | |
|---|---|---|---|
| 9,508,263 B1 | 11/2016 | Teng et al. | |
| 9,747,808 B2 | 8/2017 | Chambers et al. | |
| 2016/0229533 A1* | 8/2016 | van Cruyningen | ..... B64C 13/18 |
| 2016/0307447 A1 | 10/2016 | Johnson et al. | |
| 2017/0142596 A1 | 5/2017 | Priest et al. | |
| 2018/0002010 A1* | 1/2018 | Bauer | ............... B64C 39/024 |

FOREIGN PATENT DOCUMENTS

| | | |
|---|---|---|
| CN | 107341851 A | 11/2017 |
| WO | 2016130721 A2 | 8/2016 |
| WO | 2019035960 A1 | 2/2019 |
| WO | 2019180715 A1 | 9/2019 |

OTHER PUBLICATIONS

Examination Report from counterpart European Application No. 20199487.8, dated Oct. 22, 2021, 5 pp.
(Continued)

*Primary Examiner* — Marthe Y Marc-Coleman
(74) *Attorney, Agent, or Firm* — Shumaker & Sieffert, P.A.

(57) ABSTRACT

A computing system obtains asset information, unmanned aerial vehicle (UAV) information, and regulation information, and determines, based on the obtained information, a 3-D global asset-inspection plan including a plurality of UAV route segments and respective UAV launch locations.

20 Claims, 3 Drawing Sheets

(56) References Cited

OTHER PUBLICATIONS

Response to European Examination Report dated Mar. 15, 2021, from counterpart European Patent Application No. 20199487.8, filed on Apr. 7, 2021, 5 pp.
Shakhatreh et al., "Unmanned Aerial Vehicles (UAVs): A Survey on Civil Applications and Key Research Challenges," IEEE Access, vol. 7, Apr. 9, 2019, pp. 48572-48634.
Extended European Search Report from counterpart European Patent Application No. 20199487.8, dated Mar. 15, 2021, 7 pp.
Response to Communication pursuant to Article 94(3) EPC dated Oct. 22, 2021, from counterpart European Application No. 20199487.8 filed Jan. 26, 2022, 16 pp.
Communication pursuant to Article 94(3) EPC from counterpart European Application No. 20199487.8, dated Jun. 3, 2022, 4 pp.
Response to Communication pursuant to Article 94(3) EPC dated Jun. 3, 2022, from counterpart European Application No. 20199487.8 filed Jun. 25, 2022, 29 pp.

* cited by examiner

UAV FLIGHT MANAGEMENT PLANNER

TECHNICAL FIELD

This disclosure relates to unmanned aerial vehicles (UAVs).

BACKGROUND

Large-scale industrial companies, especially in utilities, oil, and gas, may own hundreds of miles of asset infrastructure (e.g., powerlines, pipelines) that need to be inspected periodically to ensure high productivity. Recently, some entities have begun utilizing small unmanned aerial vehicles (UAVs) to perform these periodic inspections due to the UAVs' ability to quickly collect high-quality data. However, efficiently inspecting over such long distances may be logistically difficult due to several constraints, such as the coordination of multiple crews, operational requirements, UAV endurance (range), radio communication constraints, governmental regulations, terrain, and weather conditions.

SUMMARY

In general, this disclosure relates to systems and techniques for managing a flight plan for at least one unmanned aerial vehicle (UAV). As described herein, a computing system is configured to receive asset information, UAV information, operational information, regulation information, and heuristic information; and based on the received information, determine a 3-D global asset-inspection plan and segment the inspection plan into a plurality of segments defined by a plurality of UAV launch locations.

In one example, this disclosure describes a method for managing a UAV flight plan, the method comprising obtaining, by a computing system, asset information indicating at least a location of the asset; obtaining, by the computing system, UAV information indicative of at least a battery capacity and a communication range of the at least one UAV; obtaining, by the computing system, regulation information; determining, by the computing system, based at least on the asset information, the UAV information, and the regulation information, an asset-inspection plan comprising a plurality of UAV route segments and respective UAV launch locations; and outputting, by the computing system, the asset-inspection plan.

In another example, this disclosure describes a computing system comprising processing circuitry configured to obtain asset information indicating at least a location of the asset; obtain UAV information indicative of at least a battery capacity and a communication range of the at least one UAV; obtain regulation information; determine, based at least on the asset information, the UAV information, and the regulation information, an asset-inspection plan comprising a plurality of UAV route segments and respective UAV launch locations; and output the asset-inspection plan.

In another example, this disclosure describes a non-transitory computer-readable storage medium having instructions stored thereon that, when executed, cause a computing system to obtain asset information indicating at least a location of the asset; obtain UAV information indicative of at least a battery capacity and a communication range of the at least one UAV; obtain regulation information; determine based at least on the asset information, the UAV information, and the regulation information, an asset-inspection plan comprising plurality of UAV route segments and respective UAV launch locations; and output the asset-inspection plan.

The details of one or more examples of the disclosure are set forth in the accompanying drawings and the description below. Other features, objects, and advantages will be apparent from the description, drawings, and claims.

DETAILED DESCRIPTION

Figure 1:
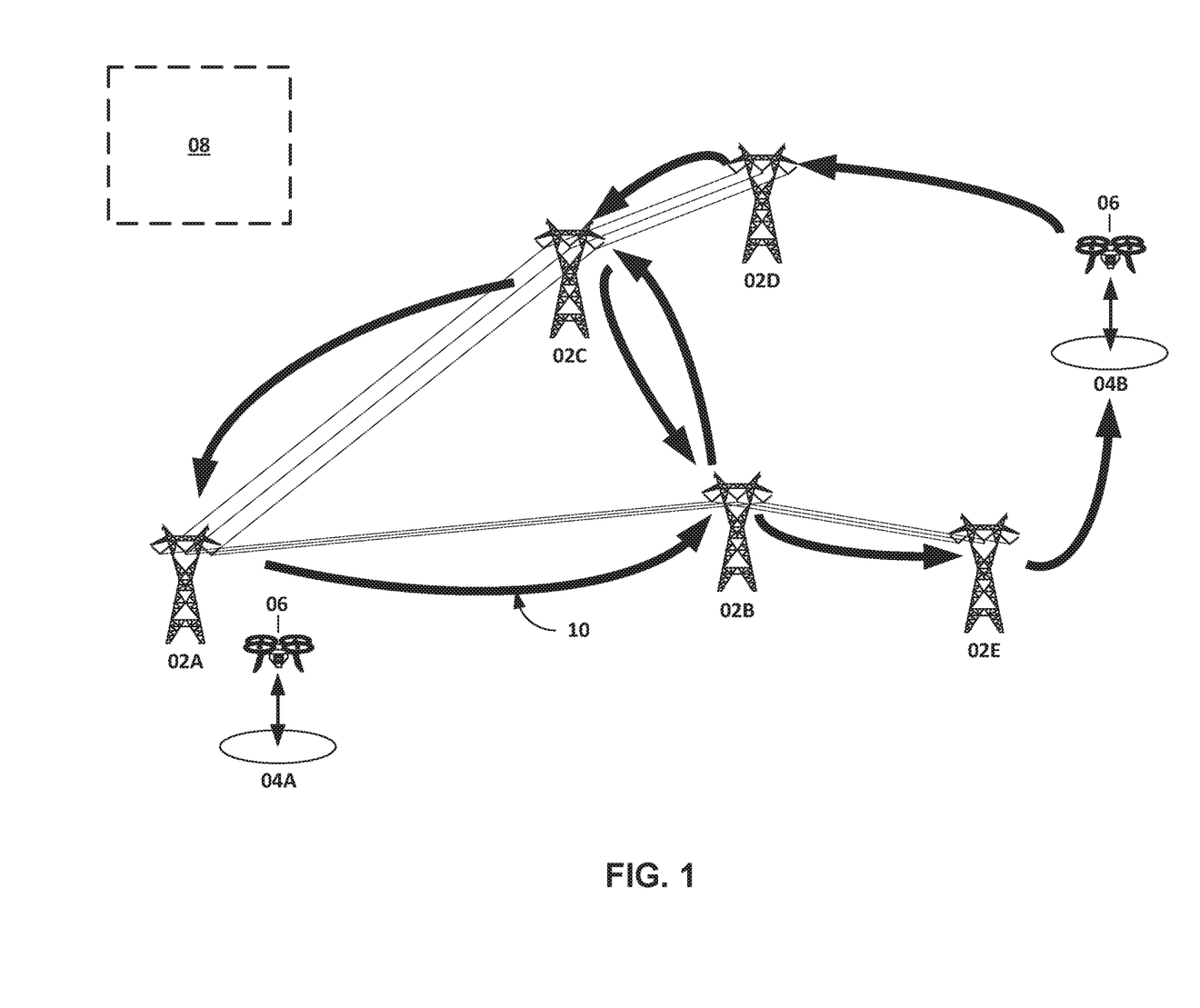
FIG. 1 is a conceptual diagram depicting an example asset-inspection plan, which may be generated according to one or more techniques of this disclosure.

FIG. 1 is a conceptual diagram depicting an example asset-inspection plan that may be generated in accordance with one or more techniques of this disclosure. Large-scale industrial companies, such as utilities, oil, and natural gas, may own hundreds of miles of connected assets 02A-02E (collectively, "assets 02"), for example, transmission infrastructure supporting one or more utilities. In the example depicted in FIG. 1, assets 02 are depicted as transmission towers for electric powerlines, however, assets 02 may include any type of extended asset infrastructure, such as powerlines, pipelines, wind turbines, data (e.g., fiber-optic) cables, roads, bridges, dams, or railroads. As shown in FIG. 1, assets 02 may include extensive infrastructure that needs to be inspected periodically to ensure high productivity. The overseeing company (or other controlling entity, such as a governmental administrative body) may employ small unmanned aerial vehicles (UAVs) 06 to perform these periodic inspections due to the UAVs' ability to quickly collect high-quality data. UAV 06 is depicted in FIG. 1 as a quadcopter, but UAV 06 may be any type of UAV including, but not limited to, a rotorcraft, compound aircraft such as tilt-rotor, X2 and X3, an aerostat, or any other such type of UAV including all vertical take-off and landing (VTOL), tail-sitter, etc. UAV 06 may be configured to fly with various degrees of autonomy. In some examples, UAV 06 may use light detection and ranging (LIDAR) for collision avoidance. Although the techniques of this disclosure are not limited to any particular type of UAV, UAV 06 may, for example, be a relatively small, low altitude, and low speed UAV, where in this context, small corresponds to under 55 lbs., low altitude corresponds to operating altitudes less than 400 feet above ground, and low air speed corresponds to air speeds less than 87 knots. Furthermore, it is contemplated that UAV 06 may have hovering capabilities, meaning UAV 06 may have the capability of remaining at an approximately constant location in the air.

In some cases, efficiently inspecting over such long distances may be logistically difficult due to several constraints, such as the coordination of multiple crews, operational requirements, UAV endurance (e.g., battery capacity), radio communication constraints, governmental regulations, terrain, and weather conditions. In general, a computing system may be configured to receive various data inputs and determine, based on the data inputs, a comprehensive asset-inspection plan 10 satisfying one or more constraints or parameters and configured to achieve one or more inspection objectives. The asset-inspection plan 10 may be sub-divided into a plurality of UAV flight segments, each flight segment defined by one or more UAV launch (e.g., takeoff and landing) locations 04A and 04B (collectively "launch locations 04"). For example, inspection plan 10 may be configured to avoid certain constraints such as a Federal Aviation Administration (FAA)-regulated no-fly zone 08. In other examples, inspection plan 10 may be configured to achieve one or more parameters, such as to reduce an overall cost associated with the inspection. For example, the inspection cost may be reduced by reducing a total travel distance between any or all of launch locations 04, or by reducing a time duration spent conducting the inspection.

Figure 2:
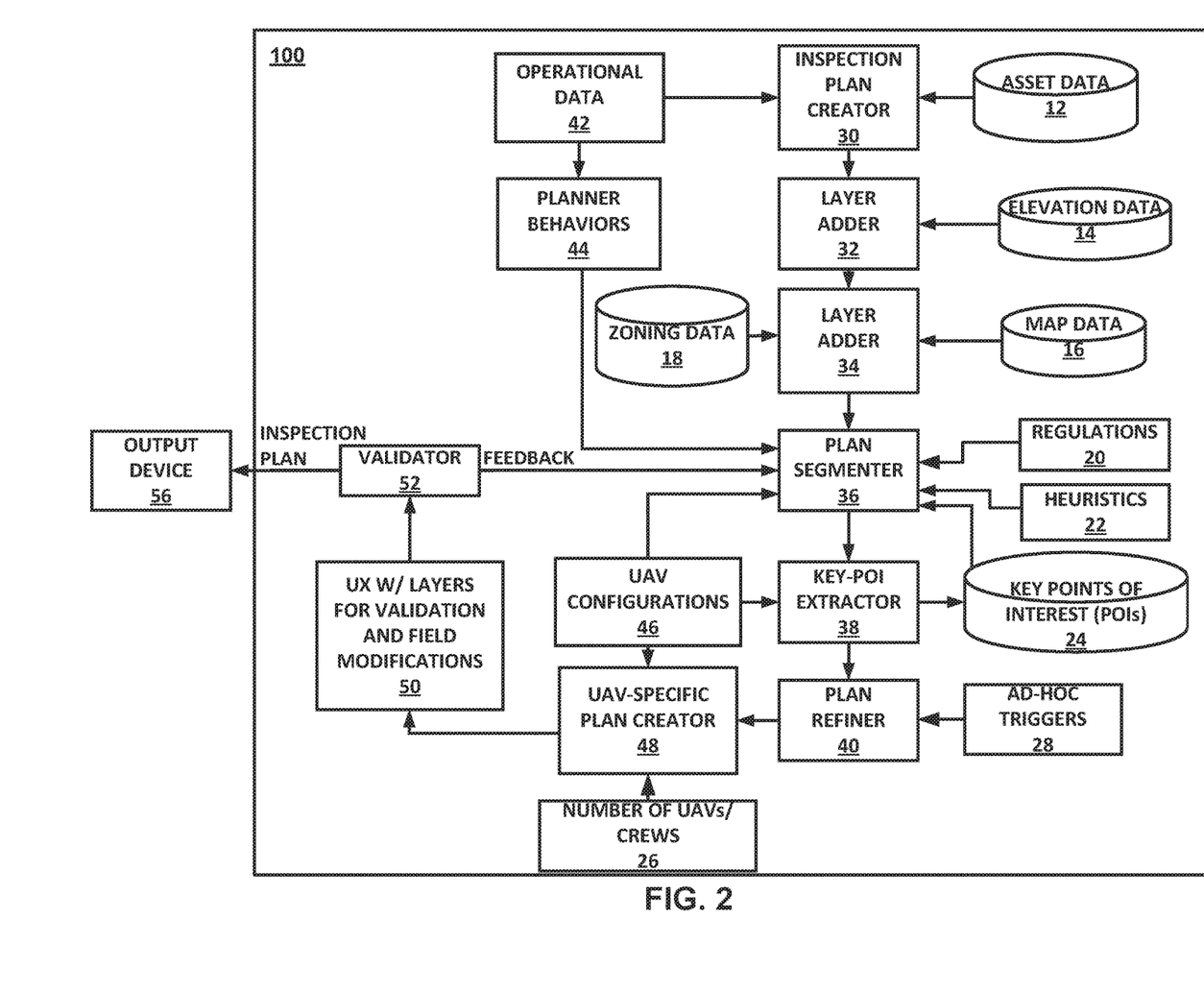
FIG. 2 is a block diagram illustrating an example computing system for determining an asset-inspection plan, in accordance with some techniques of the present disclosure.

FIG. 2 is a block diagram illustrating an example computing system 100 for generating and outputting an asset-inspection plan, in accordance with one or more techniques of the present disclosure. In the example of FIG. 2, system 100 may represent a computing system including at least one computing device, such as a mobile computing device (e.g., a smartphone, a tablet computer, a personal digital assistant, and the like), a desktop computing device, a server system, a distributed computing system (e.g., a "cloud" computing system), or any other device capable of receiving data and performing the techniques described herein. Computing system 100 includes at least a memory and processing circuitry configured to execute the modules or sub-routines described further below. Although the example of FIG. 2 depicts the various modules as separate entities, any or all of the modules may be performed by the same processing hardware, or as part of the same software method.

Computing system 100 includes 3-D global inspection plan creator 30. Plan creator 30 is configured to receive asset data 12 and operational data 42, and based on the asset data 12 and the operational data 42, generate an asset-inspection plan 10 (FIG. 1). For example, a user may input asset data 12 into system 100, or alternatively, plan creator 30 may retrieve asset data 12 from a memory stored either locally with, or remote from, system 100. Asset data 12 may generally include data indicative of an asset infrastructure to be inspected. Asset data 12 may include, for example, a type of asset infrastructure (powerlines, pipelines, renewable energy arrays, roads, etc.) and a location of the infrastructure. Asset location information may further include coordinates (e.g., World Geodetic System 1984 (WGS84) latitude and longitude coordinates) of one or more individual asset sub-units (e.g., substations, pump stations, charging stations, transmission towers, utility poles, wind turbines, or any other periodic structure disposed along an asset transmission route or line).

Inspection plan creator 30 may be further configured to receive (e.g., receive as user input and/or retrieve from memory) operational data 42. For example, a user may input operational data 42 into system 100, or alternatively, plan creator 30 may retrieve operational data 42 from a memory stored either locally or remotely to system 100. In some examples, operational data 42 (as with any other data input into system 100) may be initially input by a user, but stored in memory for later use. Operational data 42 may generally include data indicative of an inspection to be conducted on utility assets 02 (FIG. 1). For example, operational data 42 may indicate a type of data to be collected during an inspection, such as visible-spectrum photographs or an x-ray, sonar, laser, or magnetic-based fault-detection. For any of these inspection types, operational data 42 may include a vertical height at which to conduct the inspection, for example, a height at which to capture photographs of the utility assets. Operational data 42 may include data overlap (such as for image alignment), a ground-sampling distance, or a field of view (FOV) to be captured in the inspection imagery. Operational data 42 may further indicate a type of inspection target, such as one or more of cracks, rust, faults, leaks, or other structural anomalies to be identified. Based on these target anomalies and/or the type of data to be collected, operational data 42 may indicate (e.g., retrieve from memory and output) a specific type of sensing equipment or other payload to be carried along during the inspection.

In some examples, operational data 42 may include one or more inspection goals, constraints, or requirements. For example, operational data 42 may specify a time and/or date range to conduct the inspection, an inspection deadline, or a goal such as to reduce a total inspection cost, time, or travel distance, or to conserve resources such as a UAV-battery capacity. In some examples, operational data 42 may include a constraint that the UAV must remain visible (e.g., within a line-of-sight (LOS)) at all times while in flight, in accordance with FAA regulations. In some examples, operational data 42 may include a constraint requiring that the UAV must remain within an indicated maximum communication range (e.g., effective radio control distance).

Based on the received asset data 12 and operational data 42, inspection plan creator 30 is configured to generate and output a basic asset inspection plan 10, for example, an inspection plan that assumes (by default) a single, continuous UAV flightpath over a flat, open geographic surface area.

Computing system 100 includes map layer adders 32 and 34, configured to receive data to generate geographical context for inspection plan 10 (FIG. 1). For example, layer adder 32 may be configured to receive (e.g., retrieve from local or remote memory) elevation data 14 detailing the geographical terrain in the vicinity of the asset to be inspected. Layer adder 32 receives elevation data 14 and modifies the asset-inspection plan so as to maintain a visual line-of-sight (LOS) and/or line-of-communication (LOC) between UAV 06 (FIG. 1) and its ground-based controller.

Layer adder 34 receives (e.g., receives user input or retrieves from memory) map data 16 and zoning data 18. Map data 16 may include one or more geographical features or landmarks, such as ground control points (GCPs), private property, bodies of water, roads, regions with no access roads, buildings, water towers, railroads, radio antennae, cell towers, or any other structures or entities that may either inform or impede a launch, landing, and/or flightpath of UAV 06. Based on the map data, layer adder 34 modifies the asset inspection plan, for example, so as to avoid geographical obstacles. Alternatively or additionally, layer adder 34 modifies the inspection plan so as to fly over ground control points (GCPs) so as to increase the position and altitude accuracy of the collected data, such as image data.

Zoning data 18 may include one or more geographical regions in which UAV flight is either excluded, such as a designated airspace or a minimum distance from a radar tower, or permitted, such as a geo-fenced zone within which UAV 06 must remain while conducting the asset inspection. Based on zoning data 18, layer adder 34 further modifies asset-inspection plan 10 so as to avoid exclusions zones and/or remain within inclusion zones, as appropriate.

Computing system 100 includes inspection-plan segmenter 36. Segmenter 36 is configured to receive (e.g., receive as user input or retrieve from memory) asset-inspection plan 10, UAV planner behaviors 44, UAV configurations 46, regulations 20, heuristics 22, and key points of interest (POIs) 24, and based on the received data, partition inspection plan 10 into a plurality of discrete UAV flight segments.

For example, inspection behaviors 44 may describe specific routes or other maneuvers for an inspection vehicle, such as UAV 06, to conduct while performing an inspection of any individual asset. For example, inspection behaviors 44 may describe a specific UAV inspection maneuver such as circling the asset or performing a top-to-bottom vertical scan.

UAV configuration data 46 may include data indicating a number of available UAVs 06, as well as their respective technical specifications such as battery capacity, radio-communication range, maximum altitude, maximum flight speed, etc.

Regulation data 20 may include any governmental or administrative policies, statutes, laws, or guidelines governing (e.g., permitting or restricting), the times, places, and conditions under which a UAV may or may not be flown or otherwise operated. For example, Federal Aviation Administration (FAA) Small-UAS Rule § 107.31 requires that a UAV pilot must maintain a line-of-sight (LOS) with the UAV at all times during operation.

Heuristics 22 include any further data input indicative of a variable condition (e.g., is not static or constant) that accordingly must be either updated or estimated. For example, heuristics 22 may include data indicative of vegetation growth, traffic patterns, or any other condition that might affect a flightpath of UAV 06 at some times but not others. For example, vegetation growth may obstruct the LOS between the ground-based crew and UAV 06 while in flight, causing the original flightpath to need to be re-routed.

Key points of interest (POIs) 24 may include any number of useful or pertinent geolocations, including one or more known launch locations 04, remote pilot and/or visual observer locations, radio repeater locations, or other ground-based map locations from which these other POIs may potentially be derived. POIs 24 may also indicate map data including geographic regions from which launch locations, etc., may explicitly not be selected, such as bodies of water, private property, or areas with no access roads for the ground crew.

Segmenter 36 receives asset-inspection plan 10, UAV planner behaviors 44, UAV configuration data 46, regulations 20, heuristics 22, and POIs 24, and based on the received data, partitions inspection plan 10 into a plurality of UAV flight segments, each segment defined by a common UAV launch and/or landing location 04 (FIG. 1). For example, segmenter 36 identifies all sections of asset-inspection plan 10 that may be conducted from any single common UAV launch location 04. For example, a user, such as an inspection crew, may navigate (e.g., drive) UAV 06 to a first launch location 04A (FIG. 1), perform an inspection along the first inspection flight segment, and then navigate to the next launch location 04B to conduct the next inspection segment.

Segmenter 36 may be configured to determine flight segments and their respective launch locations according to one or more criteria, constraints, or parameters, as specified in operational data 42. For example, a user may specify a criteria to reduce an overall cost associated with the inspection plan, based on one or more cost factors. For example, segmenter may determine (e.g., define) flight segments and respective launch locations so as to reduce a total travel distance between UAV launch locations 04. In these examples, inspection-plan segmenter 36 may, for example, determine the minimum number of launch segments 04 necessary to cover the entirety of inspection plan 10 while maintaining radio communication with UAV 06 and without fully draining the battery of UAV 06, as well as consult map data 16 to determine the closest consecutive launch locations 04 having access roads in between them.

For example, segmenter 36 may be configured to apply combinatorial-optimization graph theory to inspection plan 10, by defining a graph wherein the "nodes" represent UAV launch locations 04, and wherein the "edges" represent existing access roads between any two nodes. The edge weight may represent, for example, the net length of the roads between two nodes, or alternatively, the time it would take to travel between two nodes, based, for example, on the posted speed limit, terrain, traffic signals, etc.

Segmenter 36 may then compute a solution to the defined graph so as to further define an inspection route. For example, an inspection route may define a route (e.g., either a complete loop or a route having a starting point and an ending point) along the edges (e.g., roads) that intersects every UAV launch location 04 at least once. Segmenter 36 may apply either brute force (e.g., may check every possible inspection route) or one or more known algorithms (e.g., Dijkstra's algorithm) in order to reduce (e.g., minimize) the total edge weight of the inspection route.

In some examples, segmenter 36 may further evaluate the determined flight segments and respective launch locations 04 to once again ensure that UAV 06 is continuously visible along each UAV flight segment from ground level at each respective UAV launch location 04. If segmenter 36 identifies a break in the LOS (e.g., due to terrain, buildings, elevation, vegetation, or other obstacles), segmenter 36 may terminate that particular segment, and add or rearrange UAV launch locations 04 as appropriate.

System 100 includes point-of-interest (POI) extractor 38. POI extractor 38 may be configured to identify, from any of the previous data inputs of inspection plan 10, one or more remote pilot and/or visual observer locations, launch locations 04, radio repeater locations, or other useful, pertinent geolocations, and store these POIs for use in future inspection plans. Extractor 38 may send identified POIs to validator 52. As part of a user-feedback refinement loop, validator 52 allows a user to either approve or disapprove of one or more launch locations 04 or other POIs. For example, system 100 may generate inspection plan 10 based on user-verified UAV takeoff locations 04 from previous inspections.

System 100 includes plan refiner 40, configured to further refine inspection plan 10 based on received (from user input or retrieved in response to a query) ad-hoc data 28. Ad-hoc data 28 includes, for example, data indicating temporary or transitory events or objects that may affect inspection plan 10 at a particular point in time, but not at other points in time. Ad-hoc data 28 may include, for example, weather events, sporting events, presidential transfer motorcades, or any other criteria that may temporarily affect the physical or legal ability for UAV 06 to carry out any or all of inspection plan 10. For example, sporting events and presidential transfers represent two non-limiting examples of events that could generate a temporary no-fly zone in the vicinity of the event. A weather event such as high winds may effectively expand an existing no-fly zone so as to prevent the UAV from inadvertently being blown into the no-fly zone. Plan refiner 40 is configured to further modify and/or update UAV launch locations and/or flight segments based on the received ad-hoc data 28.

System 100 includes UAV-specific plan creator 48. Once plan refiner 40 has determined (e.g., updated) launch locations 04, UAV-specific plan creator 48 may receive, from user input (or retrieved from memory as stored from previous user input), data 26 indicating the number of available UAVs, crews, and/or transfer vehicles, and manufacturer-specific UAV configurations 46, and determine, based on the received data, which particular UAV and its respective crew will conduct which respective flight segments. In some examples, creator 48 may also determine and indicate a specific order in which each UAV or crew is to inspect each segment, for example, so as to either reduce an overall driving distance or an overall inspection time and/or cost. As one example, plan creator 48 may assign longer flight segments to a UAV 06 having a larger battery capacity, and accordingly, a longer flight range.

Creator 48 may be configured to generate and output for display an indication, such as user experience ("UX") 50, of the overall inspection plan 10, the individual flight segments, the respective launch locations 04, and/or the assigned order of segments to be inspected. In some examples, UX 50 includes one or more input mechanisms configured to allow a user to modify the determined plan while in the field conducting the inspection based on inspection plan 10. For example, the format of UX 50 may include an input box, dropdown menu, movable map elements, or other graphical elements that allow a user to indicate additional or differing constraints, such as unexpected roads, road closures, or any other elements that might affect the placement of the UAV launch locations or the arrangement of the UAV flight segments.

Computing system 100 further includes user validator 52, which may output UX 50 and/or receive an indication of an approval of the inspection plan by the user, a rejection of the inspection plan, and/or further feedback on the particular aspects of the inspection plan, such as the individual UAV launch locations 04 or flight segments. Validator 52 may send particular feedback to segmenter 36 in order to re-generate the individual plan segments and/or launch locations 04 based on the user feedback. In the event that validator 52 receives user approval of inspection plan 10, validator 52 may be configured to further output inspection plan 10 to output device 56 so that the inspection may be conducted according to the inspection plan.

In some examples, output device 56 may include a display screen, a file in memory, or alternatively or additionally, a UAV controller device. In some examples, UAV 06 may be under the constant, or near-constant, control of a user of controller device 06. In other examples, controller device 06 may deliver an inspection plan, including flightplan 10, to UAV 06, and onboard processing circuitry of UAV 06 may be configured to execute the inspection, with little or no additional user input.

In some examples, output device 56 comprises a general-purpose device such as a personal digital assistant (PDA), a laptop or desktop computer, a tablet computer, a cellular or satellite radio telephone, a smartphone, or another such device. In examples where output device 56 is a general-purpose device, output device 56 may be loaded with and configured to execute software designed to control UAV 06. In other examples, output device 56 is a special-purpose device designed specifically for use in controlling UAV 06.

Output device 56 may communicate with UAV 06 via a communication link. The communication link may, for example, be a direct link through a radio communication protocol, such as Wi-Fi, Bluetooth, ZigBee, a proprietary protocol, or any other suitable protocol. In other examples, a communication link may be a network-based link where output device 56 communicates with UAV 06 through one or more intermediary devices such as gateways, routers, switches, repeaters, or other such network devices.

Figure 3:
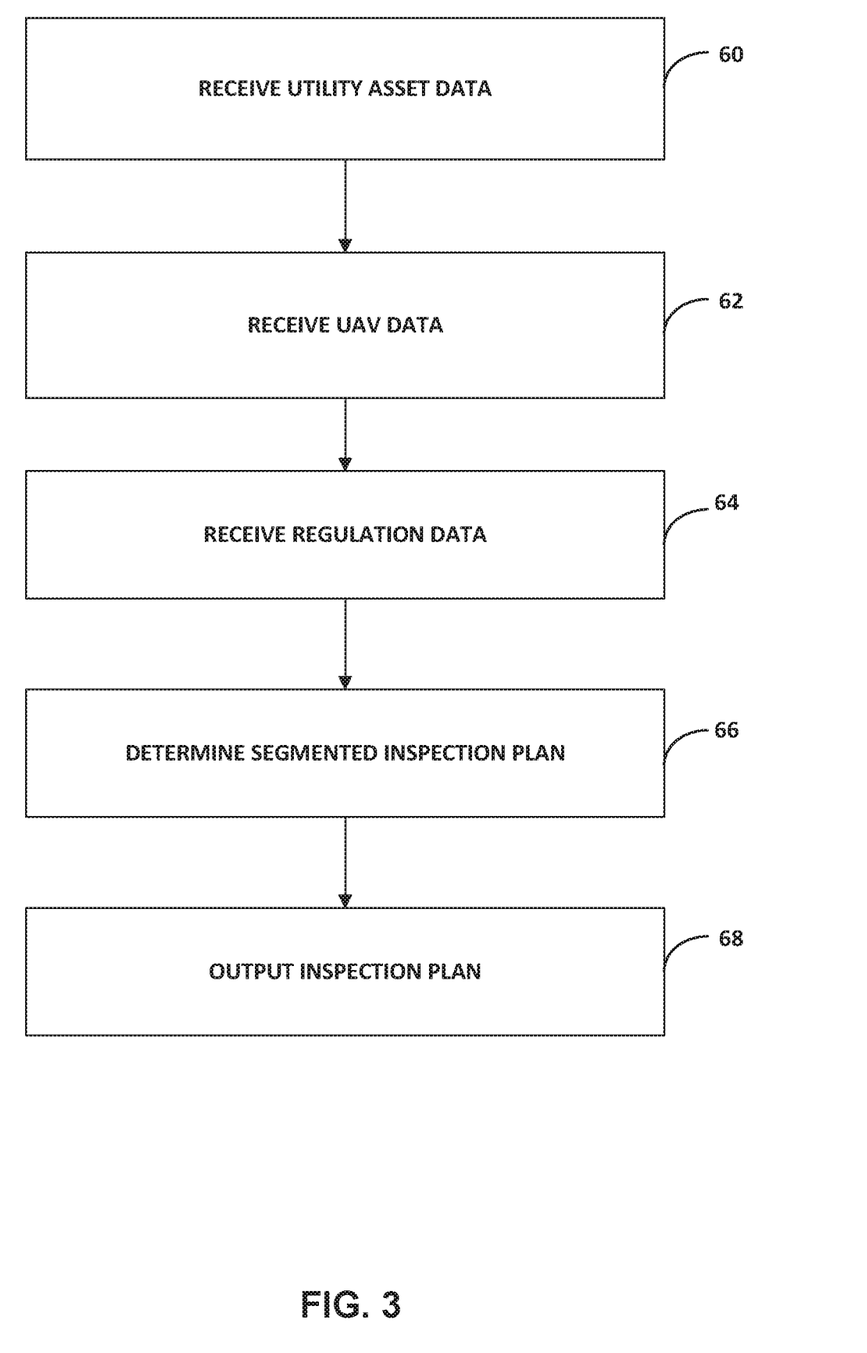
FIG. 3 is a flowchart illustrating an example operation for generating a segmented asset-inspection plan, in accordance with a technique of this disclosure.

FIG. 3 is a flowchart illustrating an example operation for generating a segmented utility-asset-inspection plan, in accordance with a technique of this disclosure. The techniques of FIG. 3 are described with reference to the example implementations of FIGS. 1 and 2 for ease of understanding only, and may be performed by any other suitable implementing components. Computing system 100 obtains (e.g., receives from input or retrieves from memory) data indicative of an asset infrastructure 04 (60). This asset data or information may include a type (e.g., category) and location (e.g., coordinates) of one or more electrical transmission towers, telephone poles, stretches of pipeline (e.g., oil or natural gas), pumping stations, stretches of transmission lines or data cables, or the like. The received data may further include a description of the surrounding elevation and/or terrain, a map of nearby waypoints, access roads, or any other relevant structure, infrastructure, or geographical feature.

Computing system 100 further obtains (e.g., receives from input or retrieves from memory) data indicative of one or more UAVs 04 configured to conduct an inspection of the identified utility-asset infrastructure (62). The UAV information may include, for example, at least a number of UAVs as well as the respective flight range (e.g., battery life) and communication range (e.g., maximum control distance) of each UAV 04.

Computing system 100 further obtains (e.g., receives from input or retrieves from memory) data indicative of UAV flight regulation (64). Regulation data 20 may include, for example, FAA regulations, the location of no-fly zones, defined airspaces, or the like.

Computing system 100 further obtains (e.g., receives from input or retrieves from memory) heuristic data 22 (64). Heuristic data 22 may include any other data relevant to determining, planning, or generating a utility-asset-inspection plan. For example, heuristic data may include one or more inspection objectives or constraints, such as conserving UAV battery life, minimizing a total inspection driving distance, or minimizing a total inspection time. Data 22 may include an inspection starting and/or ending location, such as a business, hotel, warehouse, or UAV-storage facility. Data 22 may include one or more points of interest (POIs), such as previously verified UAV-launch locations. Data 22 may also include one or more ad-hoc triggers, such as temporary events that may affect the physical ability, or the legal freedom, to conduct the UAV inspection. Examples include a sporting events (e.g., ballgames), high-security operations (e.g., presidential-transfer motorcades), or adverse weather events.

In response to receiving the above-described data sets, computing system 100 is configured to process the data to generate a global 3-D inspection plan 10 and partition the inspection plan into a plurality of discrete UAV flight segments, each flight segment defined by a corresponding UAV launch location 04 (66). As illustrated by the following example pseudocode, computing system 100 may include processing circuitry containing therein a set of executable instructions configured to receive as input at least a set of utility asset information (e.g., utility poles, etc.) and regulation information (regulated space, etc.), and select a set of UAV takeoff locations from a set of proposed takeoff locations, by using Dijkstra's algorithm to reduce or minimize the distance between consecutive takeoff locations.

```
Input = utility poles P, substations S, lines L, regulated space Rs, proposed takeoff
locations T, split points SP;
For locations P, S, L:
        Retrieve locations = nearby airports A, roads Ro, rivers Ri, railways Ra,
        terrain elevation E, FCC towers TFCC, and FAA towers TFAA;
    Segmentation: For all lines $L_i \in L_{[1,2,\ldots,N]}$:
        If TL = = 0 and SP = = 0
            Construct node-based connectivity map M using all poles p ∈ P,
            Apply Dijkstra's algorithm on M to obtain path R between the two
            substations in $L_i$;
            Assign coordinates of R = $T_L$;
        Else:
            Obtain $T_s$, $S_s$, and poles $P_s$ for the current line $L_i$;
            If ∀ $T_{s,i}$ ∈ $T_s$, and if poles ∃ $P_{i-1,\ldots,N}$ ∉ $P_s$:
                Construct connectivity map for poles $P_{i-1,\ldots,N}$:
                Apply Dijkstra's algorithm and obtain additional takeoff with
                all poles s. t. $P_c$ =P for line $L_i$, where $P_c$ is covered poles;
            Else
                Break;
            End If
        End If
End For
```

In another example, computing system 100 may include processing circuitry containing therein a set of executable instructions configured to receive as input at least a starting location (hotel, etc.), a set of utility asset information (e.g., utility poles, etc.) and a set of proposed UAV takeoff locations, and select a subset of UAV takeoff locations by using combinatorial-optimization graph theory to define an inspection route that reduces or minimizes the travel distances between consecutive takeoff locations.

```
Input = Takeoff locations T, Hotel H, or inspection points (poles locations P)
Do offline planning:
    For all i = $T_{1,2,\ldots,N}$ + Hotel / inspection center:
        Distance matrix D(i,j) = drive distance i to j;
    End For
    Define graph with Hotel / inspection center as fixed starting point to
    nodes, nodes = T, edges = roads;
    Identify inspection route between all nodes with minimum edge weight;
    Return ordered takeoff list ordered (T);
Do online planning:
While Takeoff locations visited (Jobs done) $T_D$ s.t. $T_D \neq T$:
    For each day of inspection:
        Get list of jobs done $T_D$;
        For remaining T or a subset of jobs $T_s \subset T$ s.t $T_s \cap T_D = \emptyset$:
            Return ordered takeoff list ordered(T);
        End For
    End For
End While
```

After computing system 100 has determined a segmented utility inspection plan 10 and respective inspection route, the computing system may output the plan, such as for display to a user (e.g., so that a user may review and/or approve the plan), or output plan 10 to a UAV 06 itself so that it may be pre-programmed to automatically conduct the individual flight segments from each of the launch locations 04 (68).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A method for managing a flight plan for at least one unmanned aerial vehicle (UAV), the method comprising:
    obtaining, by a computing system, asset information indicating at least a location of at least one asset;
    obtaining, by the computing system, UAV information indicative of at least a battery capacity and a communication range of the at least one UAV;
    obtaining, by the computing system, regulation information;
    determining, by the computing system, based at least on the asset information, the UAV information, and the regulation information, an asset-inspection plan;
    determining, by the computing system, based at least on the asset information, the UAV information, the regulation information, and map information, one or more UAV launch locations;
    determining, by the computing system, a plurality of UAV route segments defining the asset-inspection plan, each of the plurality of UAV route segments including at least one of the one or more UAV launch locations; and
    outputting, by the computing system, the asset-inspection plan.

2. The method of claim 1, wherein the asset-inspection plan is configured to reduce a cost associated with an asset inspection, and wherein reducing the cost comprises reducing a travel distance between consecutive UAV launch locations.

3. The method of claim 1, wherein determining the asset-inspection plan comprises determining the asset-inspection plan based on the map information, and wherein the map information comprises:
    terrain elevation;
    ground control points (GCPs);
    buildings;
    roads;
    regions with no ground-crew access; or radar towers.

4. The method of claim 1, wherein the regulation information comprises geographic coordinates corresponding to a regulated airspace.

5. The method of claim 1, wherein the asset-inspection plan is further determined based on points of interest (POIs) comprising:
    previously verified launch locations;
    asset substation locations; or radio repeater locations.

6. The method of claim 1, further comprising prompting a user to validate the asset-inspection plan.

7. The method of claim 1, wherein each of the UAV launch locations is configured so as to maintain a line-of-sight (LOS) between the UAV launch location and the respective UAV route segment defined at least partially by the UAV launch location.

8. The method of claim 1, wherein the asset-inspection plan is further based on information comprising:
    traffic;
    weather events;
    vegetation growth; or an outdoor sporting event.

9. The method of claim 1, wherein the asset information further indicates a type of utility infrastructure.

10. The method of claim 1, wherein determining the asset-inspection plan further comprises:
    determining, by the computing system, the asset-inspection plan configured to satisfy one or more inspection objectives based at least partially on the asset information, the UAV information, and the regulation information; and
    partitioning, by the computing system and based at least partially on the asset information, the UAV information, the map information, the regulation information, and the one or more UAV launch locations, the asset-inspection plan into the plurality of UAV route segments.

11. A computing system comprising one or more processing circuits configured to:
    obtain asset information indicating at least a location of the asset;
    obtain UAV information comprising at least a battery capacity and a communication range of the at least one UAV;
    obtain regulation information;
    determine based at least on the asset information, the UAV information, and the regulation information, an asset-inspection plan;
    determine, based at least on the asset information, the UAV information, the regulation information, and map information, one or more UAV launch locations;
    determine a plurality of UAV route segments defining the asset-inspection plan, each of the plurality of UAV route segments defined by the one or more respective UAV launch locations; and
    output the asset-inspection plan.

12. The system of claim 11, wherein the asset-inspection plan is configured to reduce a cost associated with an asset inspection, and wherein reducing the cost comprises reducing a travel distance between consecutive UAV launch locations.

13. The system of claim 11, wherein the asset-inspection plan is further based on the map information, and wherein the map information comprises:
   terrain elevation;
   ground control points (GCPs);
   buildings;
   roads;
   regions with no ground-crew access; or radar towers.

14. The system of claim 11, wherein the regulation information comprises geographic coordinates corresponding to a regulated airspace.

15. The system of claim 11, wherein the inspection plan is further based on points of interest (POIs) comprising:
   previously verified launch locations;
   asset substation locations; or radio repeater locations.

16. The system of claim 11, the processing circuitry further configured to prompt a user to validate the asset-inspection plan.

17. The system of claim 11, wherein each of the UAV launch locations is determined so as to maintain a line-of-sight (LOS) between the UAV launch location and the respective UAV route segment defined at least partially by the UAV launch location.

18. The system of claim 11, wherein the inspection plan is further based on information comprising:
   traffic;
   weather events;
   vegetation growth; or an outdoor sporting event.

19. The system of claim 11, wherein to determine the asset-inspection plan, the one or more processing circuits is further configured to:
   determine the asset-inspection plan configured to satisfy one or more inspection objectives based at least partially on the asset information, the UAV information, and the regulation information; and
   partition, based at least partially on the asset information, the UAV information, the map information, the regulation information, and the one or more UAV launch locations, the asset-inspection plan into the plurality of UAV route segments.

20. A non-transitory computer-readable storage medium having instructions stored thereon that, when executed, cause a computing system to:
   obtain asset information indicating at least a location of the asset;
   obtain UAV information comprising at least a battery capacity and a communication range of the at least one UAV;
   obtain regulation information;
   determine based at least on the asset information, the UAV information, and the regulation information, an asset-inspection plan;
   determine, based at least on the asset information, the UAV information, the regulation information, and map information, one or more UAV launch locations;
   determine a plurality of UAV route segments defining the asset-inspection plan, each of the plurality of UAV route segments being defined by the one or more and UAV launch locations; and
   output the asset-inspection plan.

* * * * *